United States Patent
Sklivanos et al.

(10) Patent No.: US 11,815,063 B2
(45) Date of Patent: Nov. 14, 2023

(54) HYDRO POWER PLANT

(71) Applicant: Stefanos Sklivanos, Munich (DE)

(72) Inventors: Stefanos Sklivanos, Munich (DE); Georgios Sklivanos, Munich (DE)

(73) Assignee: Stefanos Sklivanos, Munich (DE)

( * ) Notice: Subject to any disclaimer, the term of this patent is extended or adjusted under 35 U.S.C. 154(b) by 229 days.

(21) Appl. No.: 17/424,716

(22) PCT Filed: Feb. 8, 2019

(86) PCT No.: PCT/EP2019/053159
§ 371 (c)(1),
(2) Date: Jul. 21, 2021

(87) PCT Pub. No.: WO2020/160786
PCT Pub. Date: Aug. 13, 2020

(65) Prior Publication Data
US 2022/0010765 A1   Jan. 13, 2022

(51) Int. Cl.
*F03B 17/06* (2006.01)
*F03B 13/26* (2006.01)

(52) U.S. Cl.
CPC .......... *F03B 17/066* (2013.01); *F03B 13/264* (2013.01); *F03B 17/068* (2013.01); *F05B 2260/506* (2013.01); *F05B 2260/79* (2013.01)

(58) Field of Classification Search
CPC .. F03B 17/066; F03B 17/068; F05B 2260/79; Y02E 10/30
See application file for complete search history.

(56) References Cited

U.S. PATENT DOCUMENTS

| | | | | |
|---|---|---|---|---|
| 210,685 A | * | 12/1878 | Goodrich | F03B 17/066 416/8 |
| 327,888 A | | 10/1885 | William | |
| 336,878 A | * | 2/1886 | Wood | B65H 39/055 271/35 |
| 510,270 A | * | 12/1893 | Hazel | F03B 17/066 415/5 |

(Continued)

FOREIGN PATENT DOCUMENTS

| | | |
|---|---|---|
| CH | 554490 A | 9/1974 |
| DE | 10348533 A1 | 5/2005 |

(Continued)

OTHER PUBLICATIONS

International Search Report with English Translation of ISR, cited in PCT/EP2019/053159 dated Sep. 25, 2019, 6 pages.

(Continued)

*Primary Examiner* — Pedro J Cuevas
(74) *Attorney, Agent, or Firm* — Cooper Legal Group, LLC

(57) ABSTRACT

A hydro power plant for the use of a water flow includes an endless moving belt on which a plurality of blades is foldably attached. The moving belt is guided around at least two deflection points in such a way that there are two rows of blades moving in opposite directions during operation. At least one of the two rows of blades is oriented inclined to the direction of the water flow. At the deflection points, the blades are folded over from a first blade position into a second blade position and from the second blade position back into the first blade position.

19 Claims, 3 Drawing Sheets

(56) References Cited

U.S. PATENT DOCUMENTS

| | | | | |
|---|---|---|---|---|
| 544,755 A * | 8/1895 | Symons | F04B 19/14 | 415/6 |
| 584,342 A * | 6/1897 | Francis | F03B 17/066 | 416/8 |
| 707,600 A * | 8/1902 | Kuentz | F03B 17/066 | 416/8 |
| 742,529 A * | 10/1903 | Heath | F03B 17/064 | 416/7 |
| 763,623 A * | 6/1904 | Nance | F03D 3/00 | 416/8 |
| 979,320 A * | 12/1910 | Johnson | F03B 7/006 | 415/5 |
| 993,221 A * | 5/1911 | Brakey | F03B 13/182 | 60/504 |
| 1,024,376 A * | 4/1912 | Struble | F03B 17/066 | 416/8 |
| 1,034,603 A * | 8/1912 | Parley | F03B 17/066 | 405/75 |
| 1,355,386 A * | 10/1920 | Christensen | F03B 17/068 | 416/8 |
| 1,443,845 A * | 1/1923 | Clarence | F03B 17/066 | 416/8 |
| 1,481,397 A * | 1/1924 | Tetetleni | F03B 17/06 | 74/DIG. 9 |
| 1,502,296 A * | 7/1924 | Doak | F03D 5/02 | 416/7 |
| 1,526,631 A * | 2/1925 | Fagan | F03D 5/04 | 416/8 |
| 1,568,718 A * | 1/1926 | Brattland | F03D 5/02 | 415/4.1 |
| 2,161,215 A * | 6/1939 | Wise | F03B 17/066 | 440/9 |
| 2,379,314 A * | 6/1945 | Merritt | F03B 17/066 | 416/85 |
| 3,730,643 A * | 5/1973 | Davison | F03D 5/04 | 290/55 |
| 3,927,330 A * | 12/1975 | Skorupinski | F03B 17/066 | 415/5 |
| 3,957,390 A * | 5/1976 | Miller | F03D 5/02 | 416/7 |
| 3,992,125 A * | 11/1976 | Schilling | F03B 17/068 | 416/8 |
| 4,049,300 A * | 9/1977 | Schneider | F03D 9/22 | 416/7 |
| 4,053,253 A * | 10/1977 | Coffer | F03B 17/068 | 416/8 |
| 4,134,469 A * | 1/1979 | Davis | F03D 13/10 | 180/2.2 |
| 4,163,905 A | 8/1979 | Davison | | |
| 4,184,805 A * | 1/1980 | Arnold | F03D 5/06 | 416/64 |
| 4,186,314 A | 1/1980 | Diggs | | |
| 4,284,191 A * | 8/1981 | Lavau | B65G 23/38 | 198/833 |
| 4,292,535 A * | 9/1981 | Diggs | F03B 17/066 | 416/8 |
| 4,347,036 A * | 8/1982 | Arnold | F03D 5/06 | 416/64 |
| 4,350,474 A * | 9/1982 | Murphy | F03B 13/1835 | 416/7 |
| 4,358,687 A * | 11/1982 | Nyc | F03D 5/02 | 416/7 |
| 4,465,941 A | 8/1984 | Wilson et al. | | |
| 4,494,008 A * | 1/1985 | Patton | F03D 5/02 | 416/7 |
| 4,536,125 A * | 8/1985 | Herman | F03D 5/02 | 416/7 |
| 4,572,962 A * | 2/1986 | Shepard | F03D 13/20 | 416/7 |
| 6,435,827 B1 * | 8/2002 | Steiner | F01D 23/00 | 416/7 |
| 6,523,781 B2 * | 2/2003 | Ragner | B64C 31/06 | 244/33 |
| 6,672,522 B2 * | 1/2004 | Lee | F03D 5/04 | 416/17 |
| 7,063,579 B2 * | 6/2006 | Voves | F03B 17/064 | 440/3 |
| 8,253,264 B2 * | 8/2012 | Becker | F03D 5/02 | 290/55 |
| 8,278,776 B1 * | 10/2012 | Arntz | F03D 5/00 | 290/54 |
| 9,115,691 B2 * | 8/2015 | Roseman | F03D 80/30 | |
| 9,212,652 B2 * | 12/2015 | Alexander | F03D 5/02 | |
| 9,702,337 B2 * | 7/2017 | Han | F03B 17/064 | |
| 11,560,873 B1 * | 1/2023 | Gregory | F03D 3/002 | |
| 2014/0140812 A1 | 5/2014 | Swamidass | | |
| 2014/0161611 A1 * | 6/2014 | Han | F03B 17/066 | 416/8 |
| 2017/0204830 A1 * | 7/2017 | Schneider | F03B 11/004 | |
| 2018/0156195 A1 | 6/2018 | Davison et al. | | |
| 2020/0055581 A1 * | 2/2020 | Sánchez-Caja | B63H 1/34 | |
| 2020/0191112 A1 * | 6/2020 | Maitre | F03B 17/068 | |

FOREIGN PATENT DOCUMENTS

| | | | |
|---|---|---|---|
| EP | 3399179 A1 | 11/2018 | |
| ES | 2274679 A1 | 5/2007 | |
| WO | 2007023432 A2 | 3/2007 | |
| WO | 2013035930 A1 | 3/2013 | |
| WO | WO-2019012233 A1 * | 1/2019 | F03B 13/264 |

OTHER PUBLICATIONS

Written Opinion with English Translation of ISR, cited in PCT/EP2019/053159 dated Sep. 25, 2019, 4 pages.

* cited by examiner

HYDRO POWER PLANT

TECHNICAL FIELD

The invention relates to a hydro power plant for utilizing a flow of water and to a method for generating a rotary motion from flowing water.

BACKGROUND

The energy use of water flows with low flow velocities has recently gained in importance, as it represents a considerable potential for future global energy supply in times of rising energy costs and dwindling primary energy sources. A variety of innovative technologies are known by means of which electrical energy can be obtained from dammed or free-flowing waters. In addition to river power plants based on the classical principle of ship or river mills, hydro power plants have recently been developed which are immersed in the flowing water in the manner of a turbine with an axis of rotation in the longitudinal direction of the water flow.

However, many of these hydro power plants have a limited scope of application or poor energy efficiency. The scalability to different river widths and depths is often not given. Furthermore, requirements such as fish passage, robustness, disturbing visibility of the plant above the water surface, operability in case of flow direction changes, etc., limit the range of application of many known hydro power plants.

An underlying problem of the invention can be seen in creating a hydro power plant for utilizing a water flow, which has a wide range of applications and at the same time exhibits high energy efficiency. Furthermore, the invention aims at providing a method for generating a rotational motion from a water flow which also enables the aforementioned advantages.

SUMMARY

A hydro power plant according to the disclosure can have an endless moving belt to which a plurality of blades are foldably attached. The moving belt is guided around at least two deflection points in such a way that there are provided two rows of blades moving in opposite directions during operation. The blades of at least one of the two rows of blades are oriented inclined to the direction of the water flow. At the deflection points, the blades are folded over from a first blade position into a second blade position and from the second blade position back into the first blade position.

A method for generating a rotational motion from a water flow may comprise inflowing an endless moving belt to which a plurality of blades are foldably attached. The moving belt is guided around at least two deflection points in such a way that a row of blades on the upstream side moves in a direction transverse to the water flow and a row of blades on the downstream side moves in the opposite direction to the row of blades on the upstream side. The blades of at least one of the two rows of blades are oriented inclined to the direction of the water flow, with the blades being folded over at the deflection points from a first blade position into a second blade position and from the second blade position back into the first blade position.

The process enables highly efficient utilization of the kinetic energy of a water flow, especially at low flow velocities. In addition, the two rows of blades in conjunction with the folding-over process of the blades at the deflection points enable the system to function even when the direction of the water flow changes, i.e. in the case of outward and backward flow such as that generated by a tidal current (tides).

BRIEF DESCRIPTION OF THE DRAWINGS

Embodiments and examples of the invention are explained in more detail below with reference to the drawings. In this context, identical reference signs denote identical or similar parts.

DETAILED DESCRIPTION

Figure 1:
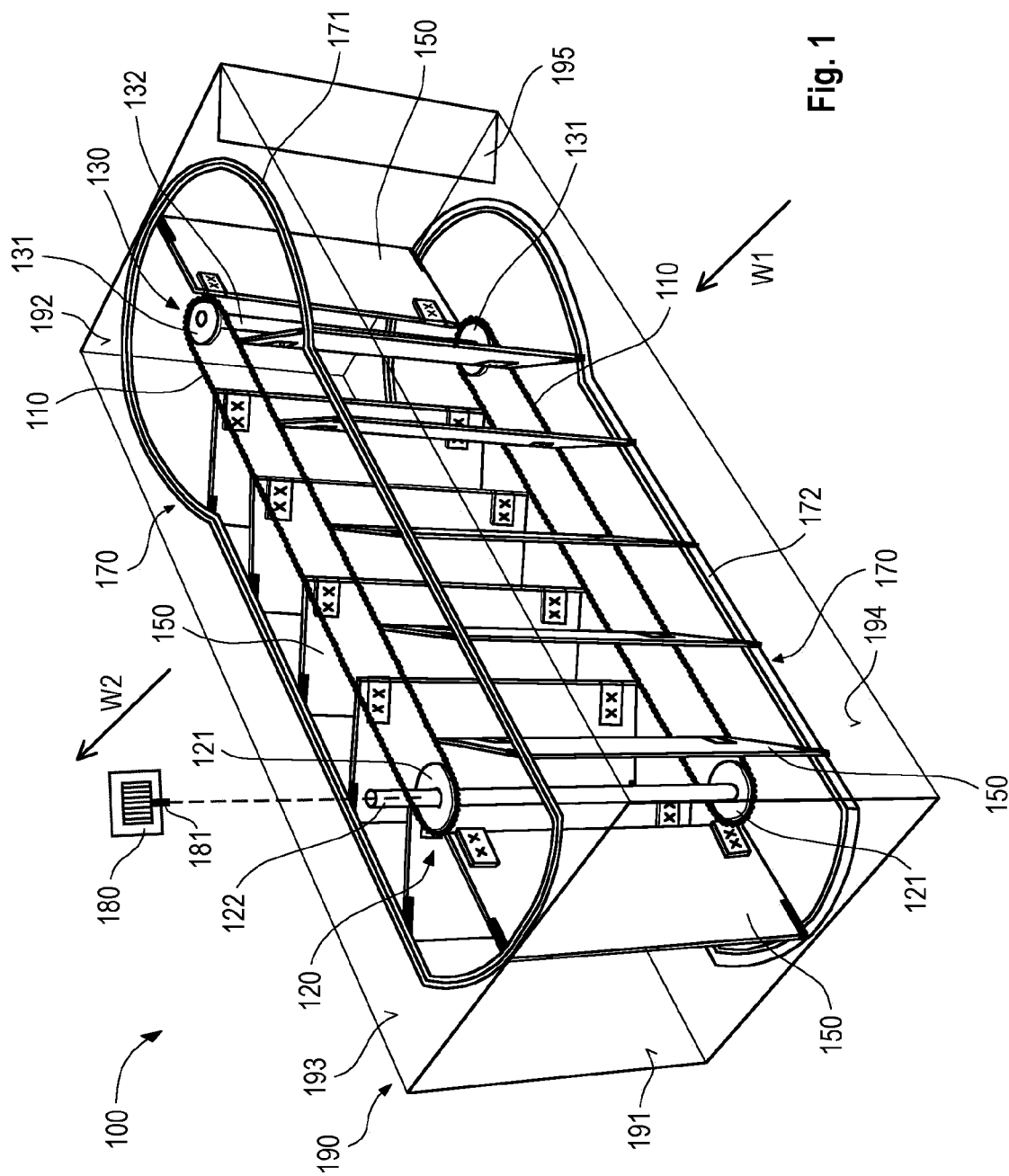
FIG. 1 is a perspective view of an example of a hydro power plant.

Due to the two rows of blades moving in opposite directions during operation, an optimum utilization of the energy of the water flow can be achieved. On the one hand, the kinetic energy of the water is transferred to a "double" number of effective surfaces by the at least two rows of blades. On the other hand, the row of blades on the upstream side (i.e., flow inlet side) can be used to selectively redirect the water flow to the second row of blades for efficiency optimization. This allows the plant to operate at high efficiency even at low flow velocities.

Due to its design, the plant is largely freely dimensionable in terms of height and width, so that it can be used for a wide range of different flowing waters (rivers, streams, canals, tidal flows, etc.). Due to the independent scalability in height and width, large flow cross-sections can also be exploited in shallow waters without parts of the plant having to protrude above the water surface.

The folding over of the blades at the deflection points can be accomplished, for example, by a guide mechanism by means of which the blades are guided. A suitable geometric design of the guide mechanism can ensure that the blades are folded over automatically at the deflection points, i.e. without additional actuation solely by their movement determined by the moving belt.

The guide mechanism can cause the blades to fold back against the running direction of the moving belt adjacent to the first deflection point, and it can cause the blades to fold forward in the running direction of the moving belt adjacent to the second deflection point.

The guide mechanism can, for example, be in the form of a circumferential guide, in particular a connecting-link guide or a guide rail.

An advantageous design of the hydro power plant is characterized in that the blades of the row of blades on the upstream side are oriented at an angle of attack of about 45° to the water flow. As a result, the kinetic energy of the water flow is converted with maximum efficiency into a movement of the moving belt. In addition, it can be provided that the blades of the downstream (i.e. flow outlet) row of blades are oriented at an angle of about 90° with respect to the blades of the inlet row of blades. This angle of attack of the blades of the downstream row of blades also results in optimum energy conversion, since the water flow deflected by the blades of the upstream row of blades now impinges on the blades of the downstream row of blades essentially with full thrust (i.e. at an essentially perpendicular angle).

The blades can be plate-shaped (i.e. flat) or curved, in particular semi-cylindrical.

The moving belt can have at least two circulating chains which are deflected around chain wheels at the deflection points. The blades can be anchored to the circulating chains so that they can be folded over.

The hydro power plant may have a generator to produce electricity, which is driven by a movement of the moving belt. For example, a rotor shaft of the generator may be rotationally coupled to a shaft of a deflection point. It is possible that the movement of the moving belt is transmitted to the rotor shaft of the generator without a gearbox.

Figure 2:
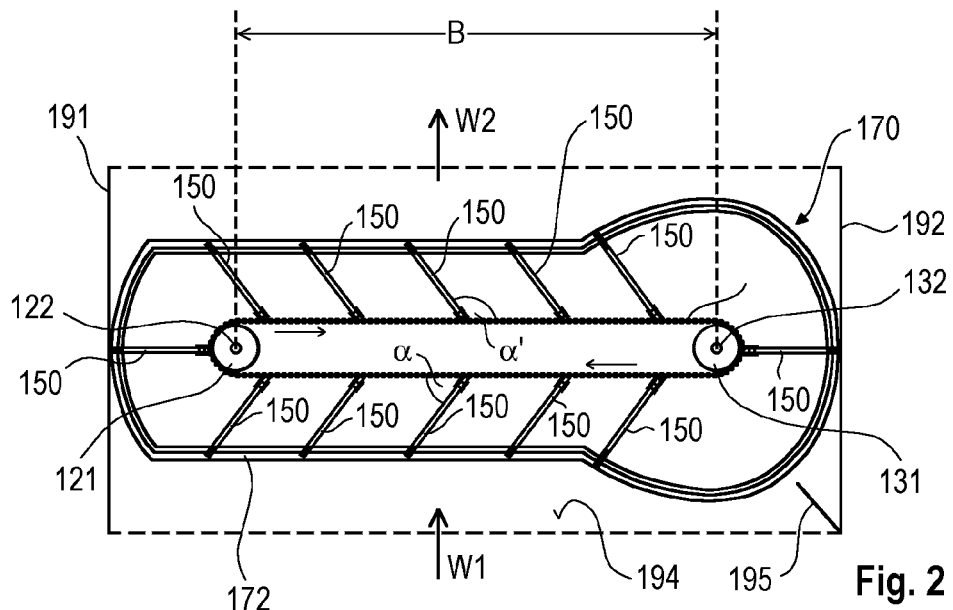
FIG. 2 is a top view of the hydro power plant of FIG. 1 with the housing cover wall open.

FIGS. 1 and 2 illustrate an example of a hydro power plant 100. The hydro power plant 100 is intended to be immersed in a water flow. The arrow W1 shows the direction of the water flow flowing towards the upstream side (i.e., at the flow inlet side) of the hydro power plant 100, while the arrow W2 shows the water flow leaving the hydro power plant 100 downstream side (i.e., at the flow outlet side).

The (optional) mirror symmetry of the system makes it clear that the water flows W1 and W2 can also be directed in opposite directions, i.e. in this case the arrow at W2 would be directed in the opposite direction and indicate the upstream flow direction, while the arrow W1 in the opposite direction would indicate the downstream flow direction.

The hydro power plant 100 includes an endless moving belt 110, which in the illustrated example may be implemented, for example, in the form of two chains 110 running parallel to each other. The moving belt (here, for example, in the form of the two chains 110) is deflected at two deflection points 120, 130. In the illustrated example, a deflection of 180° is shown in each case. The upstream section of the moving belt and the downstream section of the moving belt can thus move in two linear motions in opposite directions. The moving belt plane (here running through the two chains 110) is oriented perpendicular to the direction W1 of the water flow, for example.

The deflection points 120, 130 can be implemented, for example, by chain wheels 121, 131, around each of which a moving chain 110 rotates in a frictionally coupled manner.

The chain wheels 121, 131 of the upper chain 110 can, for example, be coupled in a rotationally fixed manner to the respective lower chain wheels 121 or 131 via a shaft 122 or 132.

It should be noted that there are other constructional possibilities. For example, toothed belts or the like can be used instead of the chains 110 and toothed belt pulleys can be used instead of the chain wheels 121, 131.

The axes of rotation of the shafts 122, 132 extend in a substantially vertical direction, i.e., substantially perpendicular to the surface of the water flow. This distinguishes the hydro power plant 100 from, for example, water mills or turbine systems in which the axes of rotation are oriented parallel to the surface of the water flow (water mill) or parallel to the water flow (turbine system).

For example, blades 150 are hinged to the circulating moving belt at equal intervals. The attachment of the blades 150 to the moving belt (e.g. chain 110 or toothed belt, etc.) is hinged, i.e. the blades 150 can change their position relative to the moving belt.

As can be seen in FIGS. 1 and 2, the blades 150 on the upstream side of the row of blades (at arrow W1) can all be oriented at the same angle $\alpha$ relative to the moving belt in the running direction (see arrow), while the blades 150 on the downstream side of the moving belt can also all be oriented at the same angle $\alpha'$ relative to the moving belt in the running direction (see arrow). At the deflection point 120, a folding back of the blades 150 from the angle $\alpha$ to the angle $\alpha'$ takes place, while at the deflection point 130, a folding forward of the blades 150 from the angle $\alpha'$ to the angle $\alpha$ takes place.

For example, the angle $\alpha$ may be about 45°, i.e. the blades 150 of the upstream row of blades may be substantially inclined at 45° with respect to the water flow W1.

The angle $\alpha'$ can be, for example, about 135°, i.e. there can be a folding over of the blades 150 by, for example, about 90° at the deflection points 120 or 130.

It should be noted that the angle specifications $\alpha=45°$, $\alpha'=135°$ are merely exemplary and can be varied, for example, in a range of ±10% or ±20% or more. It is also not necessary for the folding-over process to accomplish a 90° folding; variations of the order of, for example, up to 10° or 20° or more may also be provided here. Furthermore, there also needs not be any mirror symmetry with respect to the line connecting the shafts 122, 132. For example, it is possible that with an angle of $\alpha=45°$ the angle $\alpha'$ is, for example, only 115° or less, or even only about 90°.

The angular position $\alpha$ of the blades 150 determines the angle of attack to the upstream water flow W1 (which usually corresponds to the water flow of the flowing water) and the angular position $\alpha'$ of the blades 150 determines the angle of attack to a water flow within the hydro power plant 100, which is specified by the upstream row of blades 150 and acts on the downstream row of blades 150. For example, if the angle $\alpha'$ is only 90°, the blades 150 of the downstream row of blades are oriented in the direction of the water flow W1. In this case, therefore, only the blades 150 of the upstream row of blades are oriented inclined to the direction W1 of the water flow, while the blades 150 of the downstream row of blades are positioned parallel to the water flow W1 and can nevertheless contribute to hydrokinetic energy generation due to the inclined inflowing.

The angular position of the blades 150 on the upstream row of blades and the angular position of the blade 150 on the downstream row of blades can be determined by a guide mechanism 170. The guide mechanism 170 keeps the blades 150 in a position relative to each other that is favorable or optimal for energy absorption, which allows the system to operate effectively even at low flow velocities.

The guide mechanism 170 can include, for example, an upper circumferential guide 171 and/or a lower circumferential guide 172 of possibly identical shape. The upper circumferential guide 171 and/or the lower circumferential guide 172 can, for example, be in the form of a connecting-link guide or a guide rail.

The blades 150 can be guided by the guide mechanism 170, for example, at a region remote from the moving belt or directly at their outer edge.

The hydro power plant 100 may be housed in a housing 190. The housing 190 may include two opposing side walls 191, 192 as well as a top wall 193 and a bottom wall 194. A flow baffle 195 in the form of an inlet reducer may be provided on the side wall 192, projecting into the flow area, to facilitate the folding over of the blades 150 in the region of the deflection point 130. The guide mechanism 170 (i.e., for example, the upper and/or lower connecting-link guide or guide rail 171, 172) may be attached to the top wall 193 and/or the bottom wall 194.

In order to ensure the forward and backward folding movements of the blades 150 at the deflection points 130 and 120, respectively, the guide mechanism 170 in the region of the deflection point 130 is formed, for example, in the form of a part-circular segment, while the guide mechanism 170 in the region of the deflection point 130 is composed, for example, of an inlet circle segment, in which the blade angle of α' is set to 90°, of a 180° circle segment and of an outlet circle segment, which is the mirror image of the inlet circle segment and in which the blade angle is set to α. The inlet and outlet circle segments can have an identical radius that is larger than the radius of the 180° circle segment.

Figure 3:
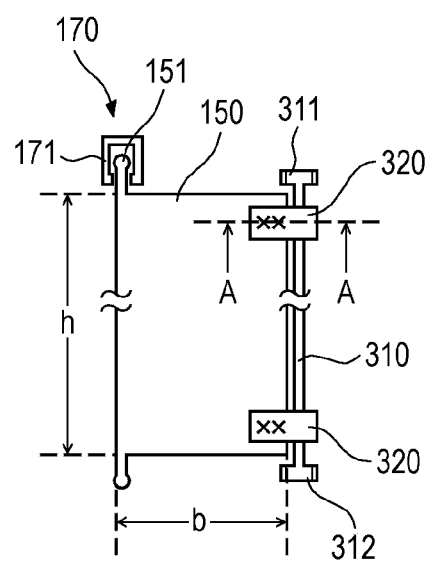
FIG. 3 illustrates in an exemplary manner the attachment of a blade to the moving belt and a guide mechanism of the blade.
Figure 4:
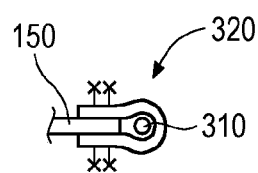
FIG. 4 is a sectional view along line A-A in FIG. 3.

FIG. 3 shows an example of a blade 150 of height h and width b. The blade 150 can be rotatably attached to a rod 310 at one side. For example, the attachment can be made via two folding hinges 320, see also FIG. 4. The rod 310 can be part of the moving belt, i.e. it can, for example, be firmly connected at its upper and lower ends 311, 312 to the upper and lower chain 110, respectively. It is also possible for the blades 150 to be attached to the moving belt not on its one side, but in an region spaced from the edge, for example in its central region.

In the example shown in FIG. 3, the guide mechanism 170 is designed as a rail guide. In this case, the upper guide rail 171 can be realized, for example, as a hollow profile (e.g. cage rail guide) into which a guide part 151 of the blade 150 protrudes.

Example dimensions of the hydro power plant 100 are b=400 mm, h=1000 mm, and B (distance between shafts 122, 132)=2000 mm. If the radius of the chain wheels is, for example, 100 mm, this results in a chain length of, for example, 4628 mm. The number of blades n can be chosen so that the projected area transverse to the flow is equal to the frontal area of the entire plant 100. In the above dimensioning example, this results in a number of blade pairs n=11 (i.e. 2 blades 150 in the fold-over region and 10 blades 150 each in the upstream and downstream row of blades).

A generator 180 (shown only schematically in the figures) may be accommodated inside or outside the housing 190 and have a rotor shaft 181 that is rotationally coupled to, for example, a shaft 122, 132 of a deflection point 120 or 130. Of course, the hydro power plant 100 may also include generators at both deflection points 120, 130 or elsewhere.

The housing 190 may be made of metal or a plastic. The housing wall thicknesses can be 1 cm or more, for example.

A variety of variations of the described examples is possible. For example, the guide mechanism 170 may not be provided circumferentially, but for example only in the region of the deflection points 120, 130. In this case, the different blade positions of the two rows of blades can be provided, for example, by a latch in the region of the blade linkage (e.g., at the folding hinges 320), which is automatically released at the deflection points 120, 130 and re-engaged after the folding process. For example, a latching armature can be provided at each blade linkage, which is raised from a first latching position upstream of the deflection points 120, 130 and lowered again into a second (different) latching position downstream of the deflection points 120, 130 after the folding-over process. Such a latching mechanism or travelling stop may also be provided in a circumferential guide mechanism 170. It is also possible to dispense with a guide mechanism 170 at the deflection points 120, 130 (or even completely) and to implement the folding-over processes in a different way, e.g. by means of a blade driver rotating faster than the shaft 132 in the region of the deflection point 130 and/or a blade return driver rotating more slowly than the shaft 122 in the region of the deflection point 120.

The hydro power plant 100 enables the generation of electric power from flowing waters with low flow velocities. The plant 100 is freely dimensionable in width and height and can thus be optimally adapted to a wide variety of operating environments. Due to the low rotational speeds of the components (blades 150), the fish life in the flowing water is not affected and the interference with nature is kept to a minimum. The system does not require floats and is not susceptible to surface flotsam as it does not have to protrude above the water surface. A grate in the inflow area of the hydro power plant 100 can further provide protection from deep flotsam, as well as protection to river animals. A further advantage of the plant 100 is that it is not necessary to dam the watercourse. In addition, the plant 100 may be configured for changing directional currents, e.g., tides.

Figure 5A:
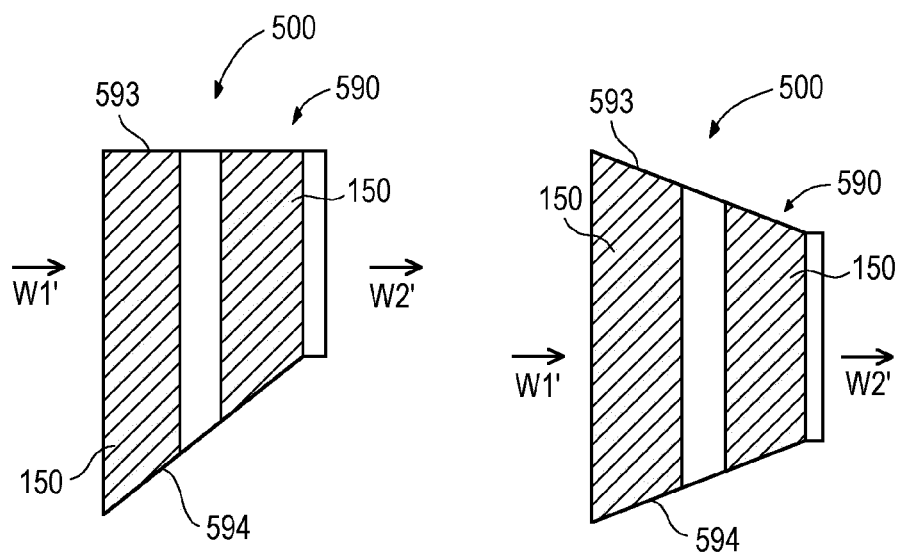
FIG. 5A illustrates in an exemplary manner two possible side views of a flow system for increasing the flow velocity for the hydro power plant.
Figure 5B:
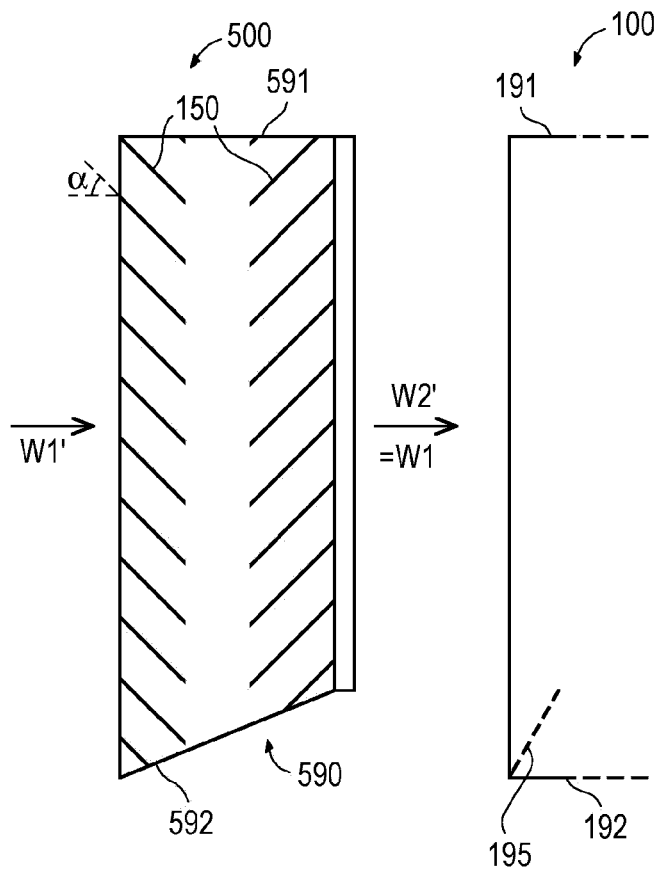
FIG. 5B is an example of a flow system in plan view.

Also described is a flow system 500, see FIGS. 5A and 5B. This can, for example, be connected upstream of the hydro power plant 100 (or also of another hydro power plant) and be provided for increasing the entry velocity of the water flow W1 into, for example, the hydro power plant 100.

The flow system 500 may be constructed identically to the hydro power plant 100, but it has stationary (i.e., blocked or non-revolving) blades 150, see the top view in FIG. 5B (with the housing ceiling wall removed). In this respect, the flow system 500 does not require a moving belt, deflection points, or guide mechanism. For example, the blades 150 of the two rows of blades may be fixedly anchored to the ceiling wall 593 (corresponding to the ceiling wall 193) and the bottom wall 594 (corresponding to the bottom wall 194) of the housing 590 (corresponding to the housing 190).

In this respect, the flow system 500 comprises an upstream row of first blades 150 and a downstream row of second blades 150, wherein the blades 150 of at least one of the two row of blades (in particular of both row of blades) are oriented inclined to the direction of the water flow, see FIG. 5B. The blades 150 of the upstream row of first blades and the blades 150 of the downstream row of second blades, respectively, may each be parallel to each other, see FIGS. 1 and 2. For further features of the flow system 500, in particular with respect to the positions of the blades 150 and the dimensioning of the system, etc., reference is made to the above description in order to avoid reiteration.

By diverting the water flow twice, the hydrostatic pressure in the flow system 500 is increased so that the exit velocity is, for example, doubled, taking into account Bernoulli's equation as a result of the increase in travel distance of the flow in the flow system 500 compared to the flow outside the flow system 500 (velocity (W2')=1.96 velocity (W1')).

Further, the cross-section of the flow jet of the flow system 500 at the outlet may be, for example, two times smaller than the cross-section of the flow jet at the inlet. This exit flow jet W2' is the inlet flow jet W1 for the attached power producing facility (i.e., the hydro power plant 100). Thus, in order to reduce turbulence losses, one reduces this inlet cross-section, for example, by half, as shown by way of example in FIGS. 5A (for example, reducing the inlet height from 1770 mm to an outlet height of 1000 mm) and 5B (for example, reducing the inlet width from 3060 mm to an outlet width of 2660 mm). By reducing (by, for example, 400 mm) the outlet width of the flow system 500, it can be achieved that the flow baffle 195 (inlet reduction) of the hydro power plant 100 projecting into the flow area is not flowed against (the hydro power plant 100 has, for example, the same housing cross-sectional dimensions (height: 1770 mm, width: 3060 mm) as the inlet cross-section of the flow system 500).

Thus, doubling (or generally increasing) the exit velocity from the flow system 500 can be achieved by a corresponding reduction in the exit cross-section of the flow system 500 (continuity equation), see for example the two examples of FIG. 5A, in which the top wall 593 and/or the bottom wall 594 of the housing 590 are inclined to narrow the flow cross-section as it flows through. Further, one or both of the side walls 591 (corresponding to side wall 191 of the hydro power plant 100) or 592 (corresponding to side wall 192 of the hydro power plant 100) may also narrow. As a result, the outlet velocity can be increased, for example, up to 3.8 times due to the Bernoulli and continuity equations. With this design, the plant can be used effectively at flow velocities as low as 0.5 m/s and, consequently, at very many river locations and, in particular, at many locations with low flow velocities (for example, tidal flows)

The flow system 500 can be placed upstream of the hydro power plant 100, if required and/or if there is a lack of space and/or if the flow velocities are very low, in order to increase its efficiency. It enables an increase and in particular a multiplication of the face velocity for the hydro power plant 100 and thus also increases the range of application of the hydro power plant 100 with regard to ecological compatibility, flowing water forms and types, and other aspects.

The following examples relate to further aspects of the disclosure of this text:

Example 1 is a hydro power plant for utilizing a water flow, which comprises: an endless moving belt on which a plurality of blades are foldably attached, the moving belt being guided around at least two deflection points in such a way that two rows of blades are provided which move in opposite directions during operation, the blades of at least one of the two rows of blades (in particular of both rows of blades) being oriented inclined with respect to the direction of the water flow, the blades being folded over at the deflection points from a first blade position into a second blade position and from the second blade position back into the first blade position.

In Example 2, the subject matter of Example 1 may optionally include wherein the folding over of the blades at the deflection points is effected by a guide mechanism by means of which the blades are guided.

In Example 3, the subject matter of Example 2 may optionally include wherein the guide mechanism adjacent the first deflection point causes the blades to fold back against the running direction of the moving belt and the guide mechanism adjacent the second deflection point causes the blades to fold forward in the running direction of the moving belt.

In Example 4, the subject matter of one or more of the preceding Examples may optionally include wherein the guide mechanism is in the form of a circumferential guide, particularly a connecting-link guide or a guide rail.

In Example 5, the subject matter of one or more of the preceding Examples may optionally include wherein the blades of the upstream row of blades are oriented at an angle of attack of about 45° to the water flow and/or the blades of the downstream row of blades are oriented at an angle of about 90° with respect to the blades of the upstream row of blades.

In Example 6, the subject matter of one or more of the preceding Examples may optionally include wherein the blades are plate-shaped or curved, in particular semi-cylindrical.

In Example 7, the subject matter of one or more of the preceding Examples may optionally include wherein the moving belt comprises at least two circulating chains that are deflected around chain wheels at the deflection points.

In Example 8, the subject matter of one or more of the preceding Examples may optionally further comprise a generator to produce electricity, which is driven by a movement of the moving belt.

In Example 9, the subject matter of Example 8 may optionally include wherein a rotor shaft of the generator is rotationally coupled to a shaft of a deflection point.

Example 10 is a method of generating a rotational motion from a water flow, comprising: flowing from the water flow onto an endless moving belt to which a plurality of blades is foldably attached, wherein the moving belt being guided around at least two deflection points in such a way that a row of blades on the upstream side moves in a direction transverse to the water flow and a row of blades on the downstream side moves in the opposite direction to the row of blades on the upstream side, wherein the blades of at least one of the two rows of blades (in particular of both rows of blades) are oriented inclined to the direction of the water flow and a folding over of the blades from a first blade position into a second blade position or from the second blade position back into the first blade position takes place at the deflection points; and converting the moving belt movement into a rotational motion.

In Example 11, the subject matter of Example 10 may optionally include wherein the rotational motion is used to generate electrical power, for example, by means of a generator.

Example 12 is a flow system comprising: an upstream row of first blades and a downstream row of second blades, wherein the blades of at least one of the two rows of blades (in particular both rows of blades) are oriented inclined with respect to the direction of the water flow W1.

Example 13 is a series connection of a flow system of Example 12 and a hydro power plant of any of Examples 1 to 9.

In Example 14, the subject matter of Example 13 may optionally include wherein the first and second blades of the flow system are stationary.

In Example 15, the subject matter of one or more of Examples 13 and 14 may optionally include wherein a flow outlet cross-section of the flow system is smaller than a flow inlet cross-section of the flow system.

The invention claimed is:

1. A hydro power plant for use of a water flow, comprising:
    an endless moving belt;
    a plurality of blades each having an inner edge and an outer edge, wherein each blade of the plurality of blades is foldably attached to the endless moving belt at the inner edge of the blade;
    at least two deflection points around which the endless moving belt is guided in such a way that a first row of blades of the plurality of blades between the at least two deflection points on an upstream side moves in a direction transverse to a direction of the water flow and a second row of blades of the plurality of blades between the at least two deflection points on a downstream side moves in a direction opposite the direction of the first row of blades on the upstream side during operation, the blades of at least one of the first row of blades or the second row of blades being oriented inclined to the direction of the water flow, and each of the plurality of blades being folded over at the at least two deflection points from a first blade position into a second blade position and from the second blade position back into the first blade position; and a guide mechanism in the form of a closed circumferential guide, the guide mechanism being configured to guide each blade of the plurality of blades at the outer edge of the blade and to effect the folding over of the blades at the at least two deflection points.

2. The hydro power plant of claim 1, wherein the guide mechanism adjacent a first deflection point of the at least two deflection points causes each blade of the plurality of blades to fold back against a running direction of the endless moving belt and the guide mechanism adjacent a second deflection point of the at least two deflection points causes each blade of plurality of blades to fold forward in the running direction of the endless moving belt.

3. The hydro power plant of claim 1, wherein the guide mechanism comprises a connecting-link guide or a guide rail.

4. The hydro power plant of claim 1, wherein at least one of:
  the blades of the first row of blades are oriented at an angle of attack in a range of ±20% of 45° to the direction of the water flow, or
  the blades of the second row of blades are oriented at an angle of 90° with respect to the blades of the first row of blades.

5. The hydro power plant of claim 1, wherein each of the plurality of blades is plate-shaped.

6. The hydro power plant of claim 1, wherein the endless moving belt comprises at least two circulating chains which are deflected around chain wheels at the at least two deflection points.

7. The hydro power plant of claim 1, further comprising:
  a generator to produce electricity, wherein the generator is driven by a movement of the endless moving belt.

8. The hydro power plant of claim 7, wherein a rotor shaft of the generator is rotationally coupled to a shaft of a deflection point of the at least two deflection points.

9. The hydro power plant of claim 1, wherein the hydro power plant is of mirror-symmetrical design and thereby configured for operation in directionally changing flows.

10. A hydro power equipment comprising the hydro power plant of claim 1 and a flow system disposed upstream the hydro power plant, the flow system comprising an upstream row of first blades and a downstream row of second blades, wherein the blades of at least one of the upstream row of first blades or the downstream row of second blades are oriented inclined to the direction of the water flow.

11. The hydro power equipment of claim 10, wherein the first blades and the second blades of the flow system are stationary.

12. The hydro power equipment of claim 10, wherein a flow outlet cross-section of the flow system is smaller than a flow inlet cross-section of the flow system.

13. A hydro power plant for the use of a water flow, comprising:
  an endless moving belt;
  a plurality of blades, wherein each blade of the plurality of blades is foldably attached to the endless moving belt;
  at least two deflection points around which the endless moving belt is guided in such a way that a first row of blades of the plurality of blades between the at least two deflection points on an upstream side moves in a direction transverse to a direction of the water flow and a second row of blades of the plurality of blades between the at least two deflection points on a downstream side moves in a direction opposite the direction of the first row of blades on the upstream side during operation, the blades of at least one of the first row of blades or the second row of blades being oriented inclined to the direction of the water flow, and each of the plurality of blades being folded over at the at least two deflection points from a first blade position into a second blade position and from the second blade position back into the first blade position; and
  a single guide mechanism comprising a closed circumferential guide, the single guide mechanism guides each blade of the plurality of blades at an outer region of the blade remote from the endless moving belt, the folding over of the blades at the at least two deflection points being effected by the closed circumferential guide.

14. The hydro power plant of claim 13, wherein the closed circumferential guide has a geometry which causes each blade of the plurality of blades to be folded over automatically, that is without additional actuation solely by movement of the blade determined by the endless moving belt, at the at least two deflection points.

15. The hydro power plant of claim 13, wherein the closed circumferential guide in a region of one of the at least two deflection points is composed of an inlet circle segment, in which a blade angle of the second row of blades is set to 90° relative to the endless moving belt in a running direction of the endless moving belt, of a 180° circle segment and of an outlet circle segment, in which the blade angle is set to the blade angle of the first row of blades.

16. The hydro power plant of claim 15, wherein the inlet circle segment and the outlet circle segment have an identical radius that is greater than a radius of the 180° circle segment.

17. The hydro power plant of claim 13, wherein the single guide mechanism comprises an upper circumferential connecting-link guide or guide rail and a lower circumferential connecting-link guide or guide rail.

18. A method of generating a rotational motion from a water flow, comprising:
  flowing from the water flow onto an endless moving belt to which a plurality of blades is foldably attached, wherein each blade of the plurality of blades comprises an inner edge and an outer edge, wherein each blade of the plurality of blades is foldably attached to the endless moving belt at an inner edge of the blade;
  guiding the endless moving belt around at least two deflection points in such a way that a first row of blades of the plurality of blades between the at least two deflection points on an upstream side moves in a direction transverse to a direction of the water flow and a second row of blades of the plurality of blades between the at least two deflection points on a downstream side moves in a direction opposite the direction of the first row of blades on the upstream side, wherein the blades of at least one of the first row of blades or the second row of blades are oriented inclined to the direction of the water flow;
  at the at least two deflection points a folding over of each blade of the plurality of blades from a first blade position into a second blade position and respectively, from the second blade position back into the first blade position takes place, wherein the folding over of each blades at the at least two deflection points is effected by guiding each blade of the plurality of at the outer edge of the blade by a guide mechanism, wherein the guide mechanism comprises a closed circumferential guide; and converting movement of the endless moving belt into the rotational motion.

19. A method of generating a rotational motion from a water flow, comprising:

flowing from the water flow onto an endless moving belt to which each blade of a plurality of blades is foldably attached;

guiding the endless moving belt around at least two deflection points in such a way that a first row of blades of the plurality of blades between the at least two deflection points on an upstream side moves in a direction transverse to a direction of the water flow and a second row of blades of the plurality of blades between the at least two deflection points on a downstream side opposite the upstream side moves in a direction opposite the direction of the first row of blades on the upstream side, wherein the blades of at least one of the first row of blades or the second row of blades are oriented inclined to the direction of the water flow;

at the at least two deflection points a folding over of each blade of the plurality of blades from a first blade position into a second blade position and, respectively, from the second blade position back into the first blade position takes place, wherein the folding over of each blade of the plurality of blades at the at least two deflection points is effected by a single guide mechanism comprising circumferential guide, wherein the single guide mechanism is closed and guides each blade of the plurality of blades at an outer region of the blade remote from the endless moving belt; and converting movement of the endless moving belt into the rotational motion.

\* \* \* \* \*